(12) United States Patent
Gordon

(10) Patent No.: US 7,645,106 B2
(45) Date of Patent: Jan. 12, 2010

| (54) | CONE-HEAD THRUST SCREW |
|---|---|
| (76) | Inventor: Mark Gordon, 33792 Doreka Dr., Fraser, MI (US) 48026 |
| ( * ) | Notice: Subject to any disclaimer, the term of this patent is extended or adjusted under 35 U.S.C. 154(b) by 234 days. |
| (21) | Appl. No.: 11/572,301 |
| (22) | PCT Filed: Sep. 3, 2002 |
| (86) | PCT No.: PCT/US02/27867<br>§ 371 (c)(1),<br>(2), (4) Date: Jun. 23, 2007 |
| (87) | PCT Pub. No.: WO2004/022986<br>PCT Pub. Date: Mar. 18, 2004 |
| (65) | Prior Publication Data<br>US 2008/0226422 A1   Sep. 18, 2008 |
| (51) | Int. Cl.<br>F16B 35/02   (2006.01) |
| (52) | U.S. Cl. ............. 411/393; 411/380; 411/386; 470/14 |
| (58) | Field of Classification Search ......... 411/393, 411/380, 394, 381, 386; 403/122–144; 470/14<br>See application file for complete search history. |

(56) References Cited

U.S. PATENT DOCUMENTS

| 676,939 | A |   | 6/1901 | Eveland |
|---|---|---|---|---|
| 975,515 | A | * | 11/1910 | Davies ............... 30/269 |
| 2,272,852 | A | * | 2/1942 | Schaefer ............. 411/337 |
| 2,346,088 | A |   | 4/1944 | Shobert |
| 2,572,613 | A |   | 10/1951 | Goff |
| 2,574,677 | A |   | 11/1951 | Wieland |
| 2,579,995 | A |   | 12/1951 | Atchison |
| 3,645,161 | A | * | 2/1972 | Wesker ............. 411/393 |
| 4,055,385 | A |   | 10/1977 | Bjors |
| 4,429,862 | A |   | 2/1984 | Niedecker |
| 4,568,216 | A | * | 2/1986 | Mizusawa et al. ....... 403/143 |
| 4,666,330 | A | * | 5/1987 | O'Connell ............ 403/143 |
| 4,989,340 | A |   | 2/1991 | Dawson |
| 5,102,587 | A |   | 4/1992 | Kumamura et al. |
| 5,104,075 | A |   | 4/1992 | Freeman |
| 5,112,153 | A |   | 5/1992 | Gunn et al. |
| 5,205,691 | A |   | 4/1993 | Steinberger |
| 6,227,751 | B1 | * | 5/2001 | Kemmer et al. ......... 403/144 |
| 2001/0029677 | A1 |   | 10/2001 | Bidwell |

* cited by examiner

*Primary Examiner*—Gary Estremsky
(74) *Attorney, Agent, or Firm*—Brooks Kushman P.C.

(57) ABSTRACT

A thrust screw (14) for applying force against an object. The thrust screw (14) comprising a housing having a ball (12) secured therein. The ball (12) having a flat planar surface (16) which contacts the objects for applying force against the object.

16 Claims, 2 Drawing Sheets

CONE-HEAD THRUST SCREW

BACKGROUND OF THE INVENTION

1. Field of the Invention

The invention relates to devices for holding or supporting an object in a desired position. In particular, the invention relates to thrust screws for applying force against an object.

2. Background Art

Thrust screws are used to apply force against an object in order to move or hold the object in a desired position. Thrust screws are screwed into position so that a surface of the thrust screw contacts the object for applying the force.

The surface in contact with the object is relatively small. This is a disadvantage. The small surface area concentrates the applied forces. Moreover, the turning of the thrust screw causes torsional forces which can mar and scratch of the object. This is another disadvantage. Still further, the surface in contact with the object does not always lie flat against the object, such as when the thrust screw is approaching the object from an angle that is not perpendicular to the object. This is another disadvantage. Yet further, many thrust screws are not self-contained items. Rather, they include elements which separate and need to be assembled for use. This is another disadvantage.

SUMMARY OF THE INVENTION

To overcome the above-identified disadvantages, the invention discloses a self-contained thrust screw having a relatively larger surface in contact with the object. Advantageously, the larger surface spreads out the applied forces. In addition, the present invention discloses a thrust screw that is freely movable relative to the object. Advantageously, the movability prevents marring and scratching of the object and allows the thrust screw to lie flat against the object. Moreover, the movability is limited by the thrust screw without the need for cooperating screws and flats.

One aspect of the invention relates to a self-contained thrust screw having an externally threaded housing. The housing includes a spherical cavity opening outwardly at a first end of the housing. The first spherical cavity includes a groove. In addition, the screw includes a ball positioned in the spherical cavity. The ball includes a flat planar surface that contacts an object for applying force against the object. Furthermore, the screw includes a retention element in the groove for interfering retention of the ball so that the ball is movable.

Another aspect of the invention relates to a method for manufacturing a self-contained thrust screw. The method includes forming a housing having a spherical cavity opening outwardly at a first end of the housing. The spherical cavity includes a groove. In addition, the method includes forming a ball having at a flat planar surface. Furthermore, the method includes interferingly retaining the ball in the spherical cavity with a retention element so that the ball is movable.

DETAILED DESCRIPTION OF THE PREFERRED EMBODIMENT(S)

Figure 1:
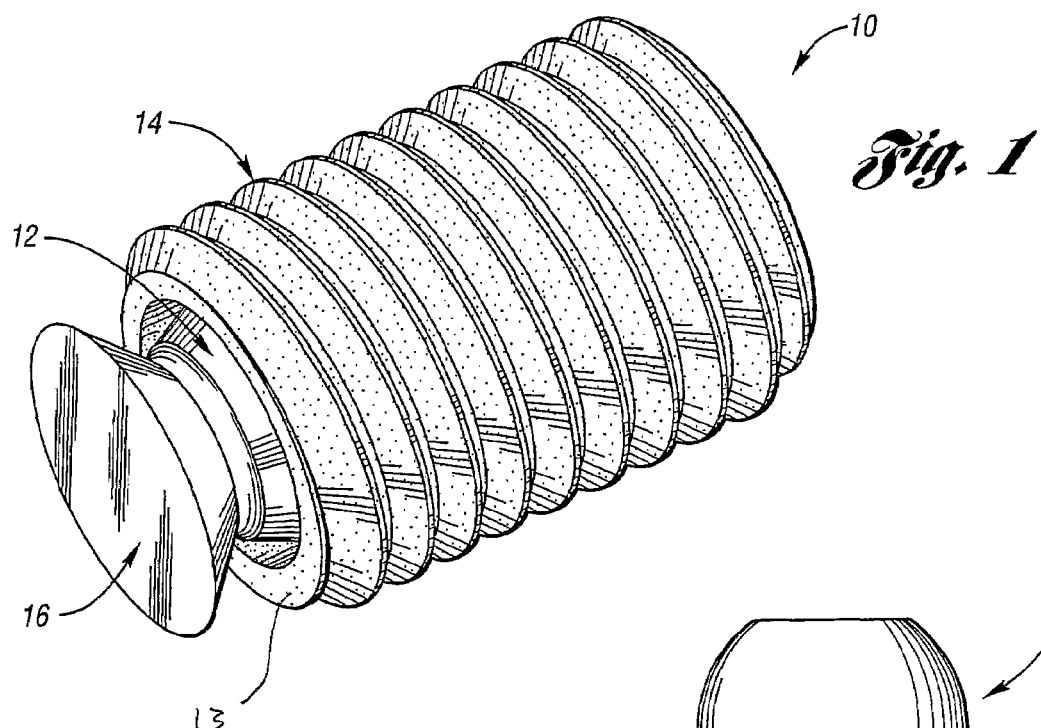
FIG. 1 illustrates a perspective view of a thrust screw in accordance with the invention.

FIG. 1 illustrates a thrust screw 10 in accordance with the present invention. The thrust screw 10 includes a ball 12 disposed in a spherical cavity 20 which opens outwardly through a first end 13 of an externally threaded housing 14. The ball 12 is shaped to provide an integral projection 15 having a narrowed neck portion N, of a diameter less than that of the ball, which projects outwardly through the first end 13 of the housing.

Figure 3:
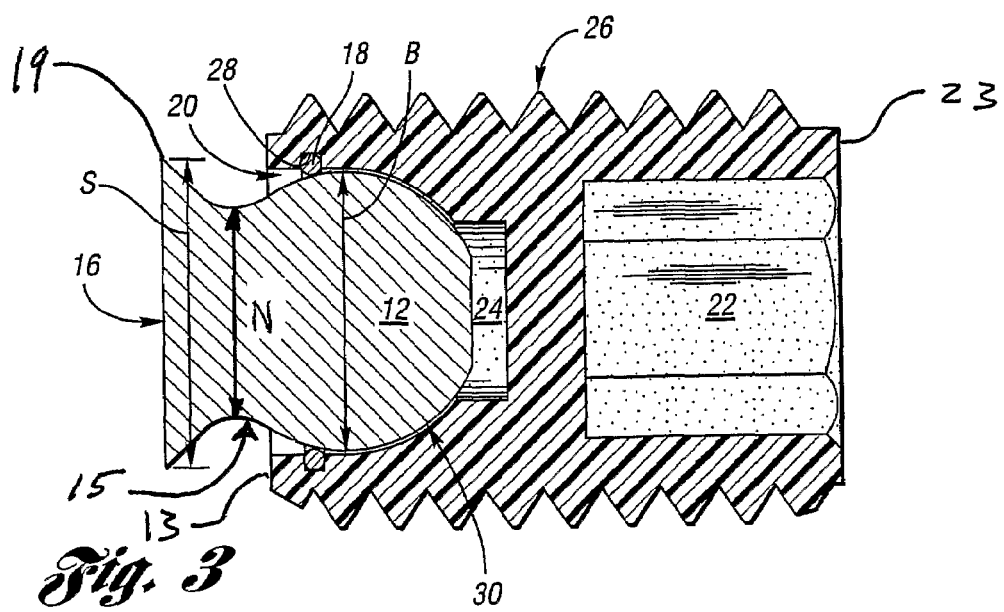
FIG. 3 illustrates an interior view of the thrust screw shown in FIG. 1 in accordance with the invention.
Figure 4:
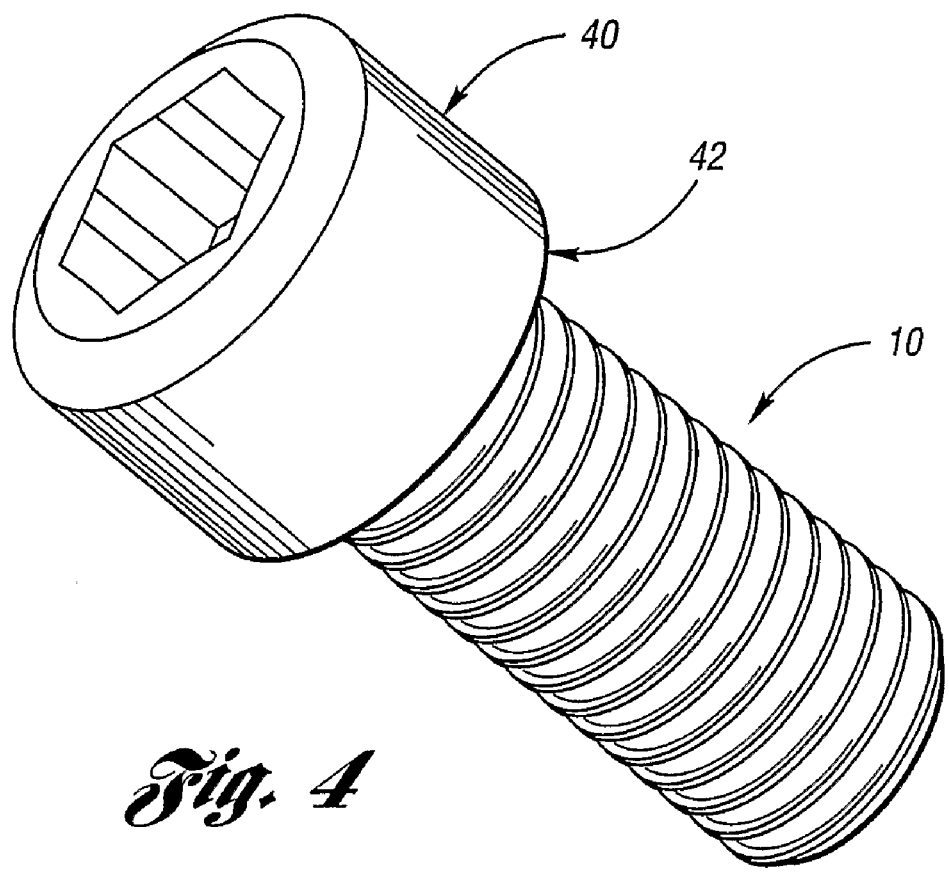
FIG. 4 illustrates a perspective view of the thrust screw having a head in accordance with the invention.

Such narrowed neck N, as shown in FIGS. 1 and 3, smoothly tapers inwardly as it projects outwardly of the cavity 20 and then reverses and tapers outwardly to the peripheral edge 19 of the resulting cone, herein sometimes referred to a cone-head, having a diameter S. Edge 19 surrounds a flat planar surface 16 of the cone-head. The thrust screw 10 is used to apply force against an object in order to move or hold the object in a desired position. Typically, the thrust screw 10 is threaded into a fixture, whereby the surface 16 is disposed beyond the fixture and against the object to be held.

The material composition of the ball 12 can be any number of different materials. Preferably, the materials are steel, plastic, and Delrin™. Moreover, the ball 12 can be custom made for the various types surfaces of the object to which the thrust screw is applied.

Figure 2:
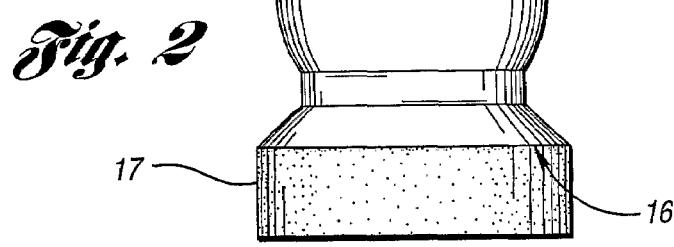
FIG. 2 illustrates a ball for use in the thrust screw having a coating in accordance with the invention.

Still further, as shown in FIG. 2, the ball 12 can include an optional overlayer 17. The overlayer 17 is located on face 16. The overlayer 17 can be a urethane or other material. The overlayer 17 can be non-abrasive to limit scratching. Moreover, the overlayer 17 can be a pliable or soft material to conform to the contour of the object. This helps prevent localizing the force at a single location by allowing the overlayer 17 to match the contour of the object. In addition, the overlayer 17 can be a durable material which limits the rate at which the surface 16 may otherwise wear down. The overlayer 17 can be glued or molded on after roughing the surface 16 and applying a bonding agent thereto.

FIG. 3 illustrates an internal view of the thrust screw 10. The thrust screw 10 includes a retention element 18, the outwardly opening first spherical cavity 20, an outwardly opening second cavity 22 at a second end 23 of the housing 14, a third cavity 24, and external threads 26. Preferably, the first spherical cavity 20 includes a groove 28. The groove 28 is used to secure the retention element 18.

The retention element 18 comprises any number elements. Preferably, the retention element 18 is either a rubber or plastic material which can sufficiently interfere against the ball 12 for retention, like an o-ring. Alternatively, the retention element can be a coil spring. The coil spring is especially advantageous for high temperature environments. The retention element 18 can be inserted in the groove 28 and secured therein with an adhesive or other means. Moreover, the retention element 18 can be simply retained with the diameter of the retention element 18 being sufficiently sized for expanding against the groove 28.

Advantageously, the ball 12 can be easily inserted by pressing the ball 12 into the first cavity 20 with enough force to overcome the interference of the retention element 18. Moreover, the ball 12 can be removed from the housing 14, even when the housing 14 is retained within the fixture, for changing out the ball 12. For example, it may be desirable to change out the ball 12 when it becomes worn or when it becomes desirable to change the material of the ball 12.

Preferably, the flat planar surface 16 is formed as an integral cone-head having a diameter S which is larger than a diameter B of the ball 18. The larger expanse of surface S helps to spread out the stresses caused by the thrust screw 10 contacting the object. By spreading out the forces, the thrust screw 10 applies maximum force to the object over a larger area than a ball could that did not have a flat planar portion larger than the diameter of the ball. Advantageously, the relative large surface 16 is especially effective for objects which are brittle, or otherwise, respond poorly to the concentrated forces caused by other thrust screws.

To facilitate screwing of the thrust screw 10 into a fixture, the thrust screw 10 includes external threads 26. Preferably, the second cavity 22 is formed like a hexagonal broach for receiving a device for assisting in the turning the threads 26. In operation the external threads 26 engage the fixture so that each turn of the threads 26 cause the thrust screw 10 to approach and move against the object for applying the force. Alternatively, the second cavity 22 can be formed with other configuration which correspond to other types of devices, like a flathead or phillips screwdriver.

In some cases, the housing 14 may eliminate the external threads 26. For example, the housing 14 could be shaped like a plug which plugs into an object. The object would then move to contact the thrust screw 10, like in a mounting operation, as opposed to the thrust screw 10 moving to contact the object.

The housing 14 includes the first cavity 20 having a spherical seat 30. Preferably, the spherical seat 30 is lubricated. The lubrication can be a grease or silicon, or it can be a Teflon coating. The spherical seat 30 and spherical nature of the ball 12 allows the ball 12 to be free floating and movable within the housing 14. Advantageously the lubrication helps to ensure that the ball 12 does not apply torsional force to the object when the threads 26 are turned into the fixture for moving the ball 12 against the object. The housing 14 can move in a rotational or a pivotal manner relative to the ball 12. The rotatability allows the thrust screw 10 to turn without the ball 12 turning against the object. Consequently, the ball 12 does not rotate against the object. This helps ameliorate marring and other blemishes to the surface of the object. Moreover, the pivotability allows the surface 16 to lie flat against the object, even when the thrust screw 10 is not applied at a perpendicular angle to the surface of the object. Consequently, the surface 16 has maximum area against the object for even disbursement of the applied force.

The third cavity 24 is an air gap which limits air pressure from building up within the first cavity 20. Without providing such relief, build up in pressure during insertion of the ball 12 can cause the ball 12 to disengage from the retention element 18 and pop-out of the first cavity 20. However, with thrust screws having relatively short axial lengths, the second cavity 22 may extend all the way through to the first spherical cavity. In this case the need for the gap 24 is obviated.

According to one aspect of the invention, the housing 14 can include a head 40. The head 40 includes a larger diameter than the threads 20. As such, a larger turning element can be used within the second cavity 22 as the second cavity 22 is now preferably formed in the head 40. The larger turning element allows the operator to apply greater force to the turning of the thrust screw 10 with greater ease. Moreover, a face 42 on the head 40 can act as a stop for the thrust screw 10.

Figure 5:
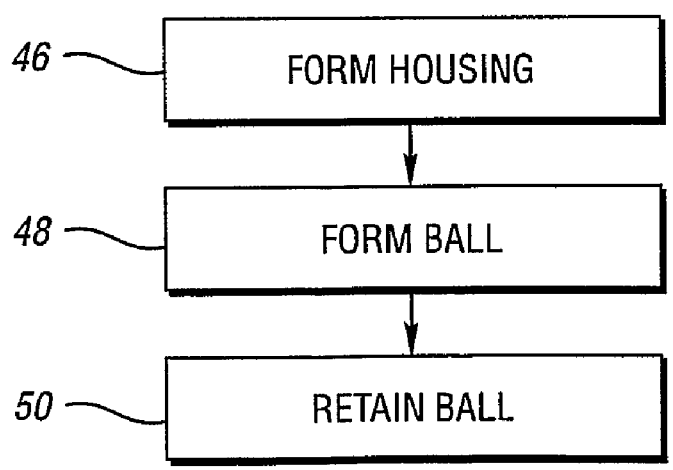
FIG. 5 illustrates a method for manufacturing a thrust screw in accordance with the invention.

FIG. 5 illustrates one aspect of the invention for use in manufacturing a thrust screw. The method includes a step 46 for forming the housing 14 with the first spherical cavity 20 having the groove 28. The method further includes a step 48 for forming the ball 12 having the flat planar surface 16.

Furthermore, the method includes a step 50 for interferingly retaining the ball in the first spherical cavity 20 with the retention element 18 so that the ball 12 is movable. Preferably, the step 50 of interferingly retaining the ball 12 further comprises inserting the ball 12 in the presence of a vacuum so that air pressure does not accumulate in the gap 24. The ball 12 can be formed by an injection molding or screw machining operation.

The narrowed neck portion N of the cone-head enables the ball 12 to pivot in the cavity 20 and also limits the degree of such pivotal movement. In the prior art, such as U.S. Pat. No. 4,429,862, cooperating pins and flats must be provided to limit pivotal movement. In the present disclosure, the narrowed neck portion N will abut the housing 14 at the end 13 thereof to limit the pivotal movement of the ball.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A self-contained thrust screw for applying force against an object, the screw comprising:
   a housing having a first spherical cavity opening outwardly at a first end of the housing;
   a ball positioned in the first spherical cavity and shaped to provide a narrowed neck portion projecting outwardly of the spherical cavity and having a flat planar surface disposed outwardly beyond the first end of the housing for applying force against the object;
   said narrowed neck portion arranged to abut said housing at said first end thereof to limit pivotal movement of the ball in the spherical cavity;
   wherein the ball is interferingly retained in the first spherical cavity with a retention element positioned in a groove therein so that the ball is movable;
   wherein the flat planar surface is a cone-head having a diameter larger than a diameter of the ball;
   wherein the ball is rotatable within the housing;
   wherein the ball is pivotable within the housing;
   wherein the first spherical cavity includes a lubricated spherical seat for accommodating the rotation of the ball;
   wherein the housing includes a second cavity opening outwardly at a second end of the housing for receiving a device for turning the housing; and
   wherein the second cavity is a hexagonal broach for receiving the device for turning the housing.

2. The screw of claim 1 wherein the ball is steel.

3. The screw of claim 1 wherein the ball is plastic.

4. The screw of claim 1 wherein the housing includes a third cavity between the first cavity and the second cavity, wherein the third cavity is an air-gap.

5. The screw of claim 1 wherein the retaining element is an o-ring.

6. The screw of claim 1 wherein the retaining element is a coil spring.

7. The screw of claim 1 wherein the housing includes a head.

8. The screw of claim 1 wherein the ball includes an overlayer affixed to the flat planar surface.

9. A method for manufacturing a self contained thrust screw, the method comprising:
   forming a housing having a first spherical cavity opening outwardly from a first end of the housing;

forming a ball shaped to provide a narrowed neck portion projecting outwardly of the spherical cavity and having a flat planar surface disposed outwardly beyond the first end of the housing for applying force against an object;
said narrowed neck portion arranged to abut said housing at said first end thereof to limit pivotal movement of the ball in the spherical cavity;
interferingly retaining the ball in the first spherical cavity with a retention element positioned in the groove so that the ball is movable;
wherein the flat planar surface is formed with a cone-head having a diameter larger than a diameter of the ball;
wherein the ball is rotatable within the housing;
wherein the ball is pivotable within the housing;
wherein the first spherical cavity is formed with a lubricated spherical seat for accommodating the rotation of the ball;
wherein the housing is formed with a second cavity opening outwardly from a second end of the housing for receiving a device for turning the housing; and
wherein the second cavity is formed with a hexagonal broach for receiving the device for turning the housing.

10. The method of claim 9 wherein the ball is formed with steel.

11. The method of claim 9 wherein the ball is formed with plastic.

12. The method of claim 9 wherein the housing is formed with a third cavity between the first cavity and the second cavity, wherein the third cavity forms an air-gap.

13. The method of claim 9 wherein the retaining element is an o-ring.

14. The method of claim 9 wherein the retaining element is a coil spring.

15. The method of claim 9 wherein the housing is formed with a head.

16. The method of claim 9 wherein the ball is formed with an overlayer affixed to the flat planar surface.

* * * * *